United States Patent

[11] 3,561,427

| [72] | Inventor | Albert Thomas Profy<br>42-07 Parsons Blvd., Flushing, N.Y. 11355 |
|---|---|---|
| [21] | Appl. No. | 718,558 |
| [22] | Filed | Apr. 3, 1968 |
| [45] | Patented | Feb. 9, 1971 |

[54] DEVICE FOR MEASURING URINARY OUTPUT
9 Claims, 5 Drawing Figs.

| [52] | U.S. Cl. | 128/2, 73/219, 128/275 |
|---|---|---|
| [51] | Int. Cl. | A61b 10/00 |
| [50] | Field of Search | 128/2, 275, 294, 295; 73/194, 424, 219 |

[56] References Cited

UNITED STATES PATENTS

| 223,034 | 12/1879 | Douglass | 73/424 |
|---|---|---|---|
| 797,144 | 8/1905 | Nickerson | 73/424 |
| 2,648,981 | 8/1953 | Drake, Jr. | 128/2X |
| 2,792,836 | 5/1957 | Reynolds, Jr. et al. | 128/275 |
| 2,879,141 | 3/1959 | Skeggs | 73/424UX |
| 3,194,069 | 7/1965 | Scott | 128/2UX |
| 3,345,980 | 10/1967 | Coanda | 128/2 |

Primary Examiner—Dalton L. Truluck
Assistant Examiner—Kyle L. Howell
Attorney—Nolte and Nolte ABSTRACT: A device for measuring the volume of urinary output during a given period of time. The device includes a drum member which has a vertical central axis and an open top, means being situated within the drum member to divide the latter into a plurality of equal compartments which are uniformly distributed about the central axis of the drum member with the center of each compartment located at a given angular distance from the center of the next compartment. A conduit member has an outlet end situated at any given instant over one of the compartments so that urine can flow through said conduit member from said outlet end thereof into a compartment to be collected therein. A support means supports at least one of these members for rotary movement about the central axis of the drum member, and a turning means is operatively connected with this one member for periodically turning the latter through the angular distance between the compartments at predetermined time intervals all of which are equal. The drum member has outer wall portions which respectively form parts of the several compartments and which are transparent and carry suitable graduations for indicating the volume of urine which collects in each compartment.

INVENTOR.
ALBERT THOMAS PROFY

BY

Nolte + Nolte
ATTORNEYS

DEVICE FOR MEASURING URINARY OUTPUT

BACKGROUND OF THE INVENTION

The present invention relates to devices for measuring urinary output.

As is well known, it is necessary to measure the urinary output of certain patients who are hospitalized. For example, where fluid is administered intravenously to a patient, it is necessary to control the rate of flow of fluid which is thus administered, and this control is achieved by maintaining an adequate urinary output on the order of 1 cc./min. Thus, if the rate of urinary output of a given patient is substantially greater than 1 cc./min. then it is necessary to reduce the feed rate of administered fluid, while if the rate of urinary output is substantially below the normal flow rate of 1 cc./min., it is necessary to increase the feed rate at which fluid is intravenously administered.

In addition to regulating the feed rate of administered fluid in accordance with the rate of urinary output, it is required under certain circumstances to measure the total urinary output of a given patient during a given period of time, such as a twenty-four hour period.

Although there are known devices for these purposes, the known constructions are exceedingly complex and expensive, they are not as sanitary as might be desired, and one of their greatest disadvantages is that they require a considerable amount of labor to be performed in connection therewith, not only with respect to attending to the device during the time when it is collecting urine but also in a connection with cleaning and washing operations, setting the device up for operation, and terminating the operations.

SUMMARY OF THE INVENTION

It is accordingly a primary object of the present invention to provide a device of the above general type which will avoid the above drawbacks.

In particular, it is an object of the invention to provide a device capable of measuring urinary output in a highly efficient manner while at the same time requiring a minimum amount of manipulative operations, so that the time which must be devoted by hospital personnel to the device of the invention is reduced to a minimum.

It is also an object of the present invention to provide a device of this type which is of such a simple construction that it is economically feasible simply to discard the parts thereof which come in contact with the urine while the device is used with a given patient, so that in this way it becomes possible to eliminate all operations in connection with hygienically cleaning the structure, after it is used with one patient, in preparation for use with the next patient.

It is furthermore an object of the present invention to provide a device of this type which can be very easily consulted at any time to give the required information.

Furthermore, it is an object of the invention to provide a device of this type which can conveniently give information not only as to the rate of urinary output but also as to properties of the urine such as its specific gravity, for example.

Also, it is an object of the present invention to provide a device of this type which makes it possible conveniently to remove the from the device, without interrupting its operation, a small amount of urine which may be tested separately from the device.

Also, it is an object of the invention to provide a device of this type which will not overflow and which, while it is used, can be closed in a manner sufficiently tight to prevent undesirable odors from escaping from the device.

Also, the objects of the present invention include the provision of the device of this type which makes it possible to use more expensive components, such as timing clocks, repeatedly with interchangeable components which are inexpensive and can be discarded, without in any way sacrificing standards of hygiene.

According to the invention, the device for measuring the urinary output includes a drum member which has a central vertical axis and an open top and which has a means which divides its interior into a plurality of equal compartments uniformly distributed about the axis with the center of each compartment located at a given angular distance from the center of the next compartment, this drum member having outer transparent wall portions respectively forming parts of the several compartments and carrying graduations for indicating the volume of urine in the compartments. A conduit member has an outlet end which at any given instant is situated over one of the compartments so that urine flowing through the conduit member will be received in this one compartment. A support means supports one of these members for rotary movement about the central axis of the drum member, and a turning means is operatively connected with this one member for turning the latter periodically about the axis of the drum member through angular increments corresponding to the angular distance between the compartments, this turning periodically taking place at equal intervals for all of the compartments so that in this way it becomes possible to measure urinary output.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
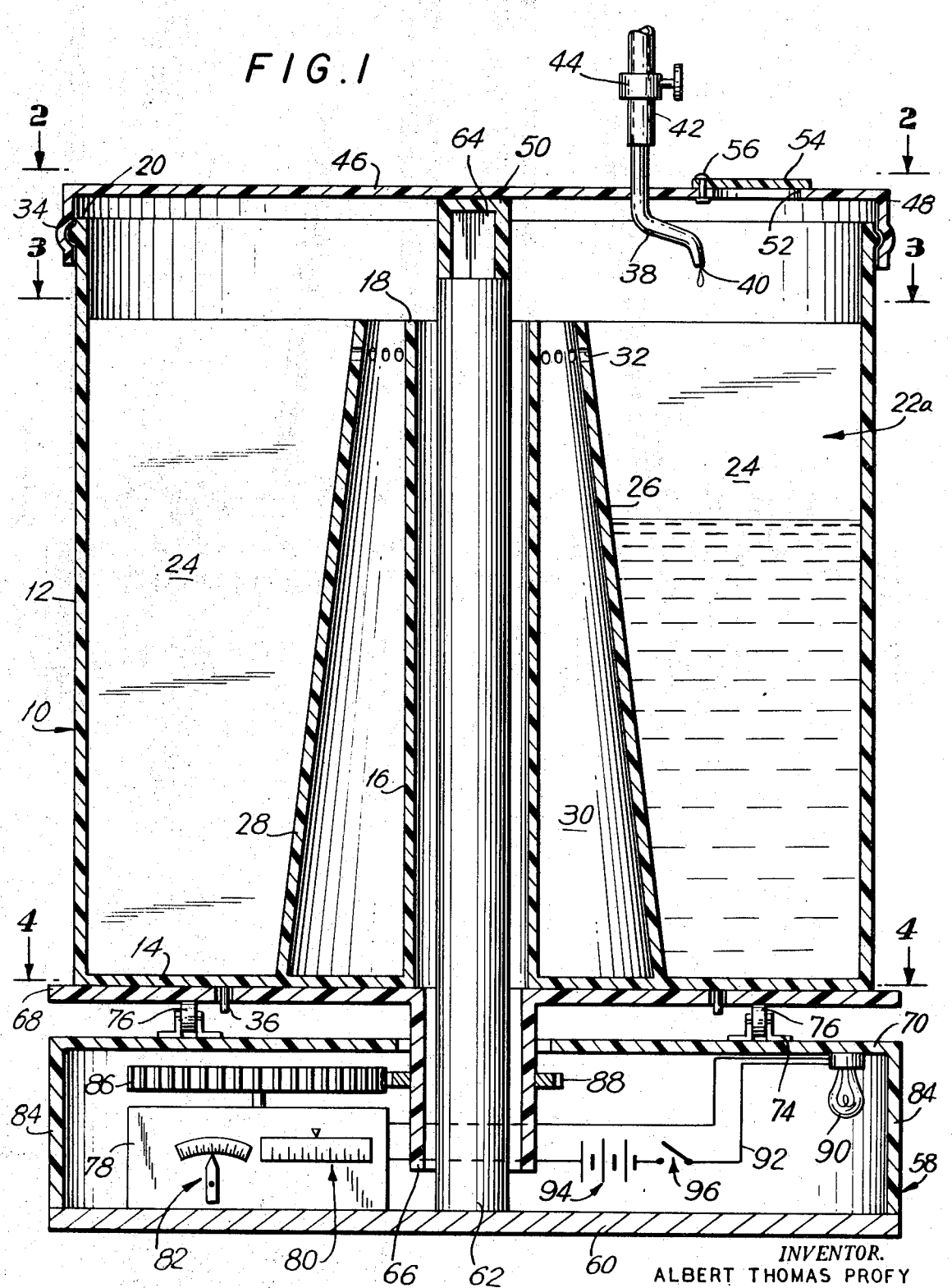
FIG. 1 is a partly schematic vertical sectional elevation of a device constructed according to the invention, the section of FIG. 1 being taken along line 1—1 of FIG. 5 in the direction of the arrows.

Referring now to the drawings, the device illustrated therein includes a drum member 10 of circular, cylindrical configuration and made of a transparent plastic material, for example. This drum member 10 has an outer cylindrical wall 12 fixed fluid-tightly to and extending upwardly from a bottom wall 14, and, if desired, the cylindrical wall 12 and bottom wall 14 may be integral. The drum member 10 has an open top and includes a central tubular inner wall 16 which is coaxial with the outer wall 12 and which is open at its top and bottom ends. Thus, the bottom wall 14 extends between and is fluid-tightly connected with the coaxial cylindrical walls 12 and 16, and it will be noted from FIG. 1 that the top end 18 of the inner cylindrical wall 16 is lower than the top end 20 of the outer cylindrical wall 12 of the drum member 10.

Figure 3:
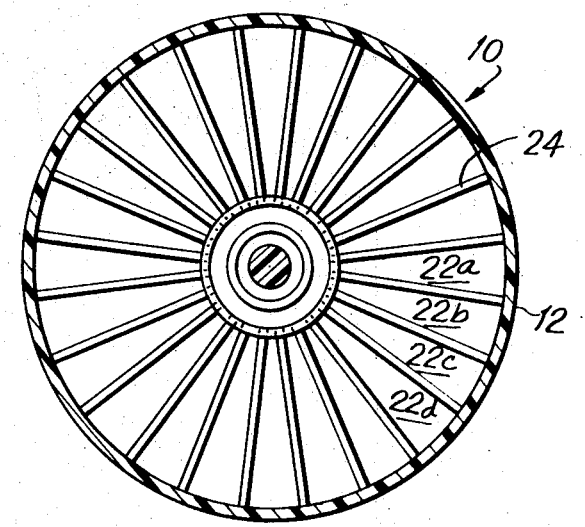

Situated within the drum member 10 is a means dividing the latter into a plurality of compartments 22a, 22b, 22c, 22d, etc., as indicated in FIG. 3, and in the illustrated example there are twenty-four of these compartments. This means which divides the interior of the drum member 10 into these compartments includes radially extending vertical partition walls 24 fixed at their outer edges to the outer wall 12 and having inner inclined edges (FIG. 1) fluid-tightly fixed to the outer surface of a tapered, frustoconical tubular member 28 which is fluid-tightly fixed at its bottom end to the bottom wall 14 and which tapers in an upward direction, as indicated in FIG. 1. In this respect, small amounts of urine may be measured more readily inasmuch as the liquid level reached will be higher than if the compartment were of uniform circumference. In manufacturing the drum in the manner shown, it is recognized that single mold technique could not be used unless member 28 was more nearly vertical.

This inner tubular partition 28 defines the inner limit of the several compartments and coaxially surrounds the inner tubular wall 16, being situated between the latter and the outer tubular wall 12 which defines the outer limits of the compartments.

The tapered intermediate tubular wall 28 defines with the wall 16 an overflow chamber 30 into which urine can overflow when reaching the region of the upper end of a given compartment. For this purpose the wall 26 is formed in the region of its upper end with a plurality of openings 32 all of which communicate with the overflow chamber 30 and which respectively communicate with the several compartments 22a, 22b, 22c, etc., so that in the event that the urine in any one compartment reaches an overflow opening 32, this urine will then overflow into the overflow chamber 30.

The outer wall 12 of the drum member 10 fixedly carries at the region of its upper edge 20 a circular bead 34 which is situated at the exterior surface of the outer wall 12.

The drum member 10 is completed by a plurality of pins 36 which are fixed to and extend downwardly from the bottom wall 14 for a purpose referred to below, the drum member having four of these pins 36 in the illustrated example, and these pins are uniformly distributed about the central vertical axis of the drum member 10.

Figure 2:
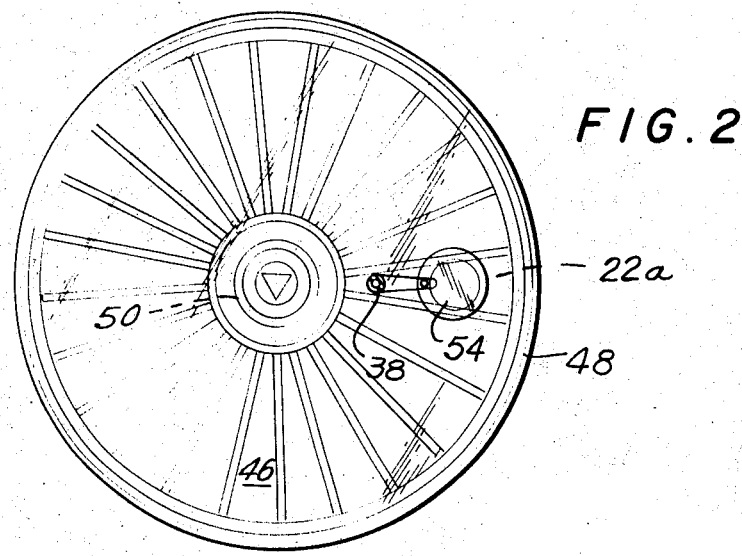
FIGS. 2—4 are, respectively, sectional plan views taken along lines 2—2, 3—3, and 4—4 of FIG. 1 in the direction of the arrows.

As is apparent from FIGS. 2 and 3, the several compartments 22a, 22b, 22c are all of equal size and are uniformly distributed about the central axis of the drum member 10, so that the angular distance from the center of one drum e member to the center of the next drum member is the same for all of the drum members, this angular distance in this case being 15°.

The device of the invention includes a conduit member 38 having a lower permanently open outlet end 40 which is situated at any given instant over one of the compartments. In the illustrated example the outlet end 40 of the conduit member 38 is situated over the compartment 22a, so that urine flowing through the conduit member 38 will fall from the outlet end 40 thereof into the compartment 22a to be collected therein. The conduit member 38 communicates through a suitable tubular connection 42 with an unillustrated catheter which receives the urine from the patient, and any suitable valve structure 44 may be provided, as schematically shown in FIG. 1, for opening and closing the tube 42. During operation the valve 44 will be open and urine will flow freely from the outlet end 40 of the conduit member 38 into a compartment.

Although it is possible to turn the conduit member 38 about the axis of drum member 10 with respect to the latter, it is preferred, for reasons pointed out below, to turn the drum member 10 with respect to the conduit member 38, and thus this conduit member 38 remains stationary and is aligned with the front of the device which is situated at the right in FIG. 1. Thus, in the illustrated position of the device the compartment 22a is situated in front and receives urine.

The conduit member 38 is fixed to and extends fluid-tightly through a lid 46 which covers the drum member 10. For this purpose the lid 46 has at its outer periphery a downwardly extending flexible flange 48 capable of snapping over the bead 34, and the coaction between the flange 48 and the bead 34 is such that the latter can turn freely with respect to the flange 48 sliding along the latter. At its center the lid 46 fixedly carries a block 50 which extends downwardly from the underside of the lid 46 and which is formed with a bore of triangular cross section extending upwardly from the bottom end of the projection 50.

The lid 46 is also formed with an opening 52 angularly aligned with the conduit member 38 so that this opening 52 is situated over the compartment which at any given instant is receiving urine from the conduit member 38. Thus, in the illustrated example the opening 52 is situated over and aligned with the compartment 22a.

A cover member 54 is provided for covering and uncovering the opening 52. For this purpose the cover member 54 is directly carried by the lid 46 at its top surface and is pivotally connected to the latter by a pin 56, so that the cover 54 can be swung around the pin 56 either to a location uncovering the opening 52 or to a location covering the latter.

The device of the invention further includes a base means 58 having a baseplate 60 adapted to rest on any suitable horizontal surface. A center post 62 is rigidly fixed at its bottom end to the base plate 60 and extends upwardly therefrom coaxially through the tubular inner wall 16 of the drum member 10. At its top end the center post 62 has an upwardly extending projection 64 of triangular cross section which is received in the bore of the projection 50 as indicated in FIG. 1, so that in this way the lid 46 is directly carried by the center post 62 and is prevented by the coaction of projections 50 and 64 from turning together with the drum member 10. Further, the species of the bore of projection 50 and of projection 64 act to position the conduit 38 over the front compartment 22a.

The center post 62 also extends through a tubular member 66 which is fixed at its top end to the inner circular edge of a circular plate 68 which is formed with a central opening aligned with the tubular member 16, this assembly 66, 68 forming a support means which supports the drum member 10 for rotary movement about its central axis which coincides with the axis of the post 62. The base means 58 has a top wall 70 formed with a central opening through which the tubular member 66 passes as indicated in FIG. 1. The plate 68 of the support means for the drum member 10 is formed with four openings 72 (FIG. 4) which respectively receive the pins 36 so that in this way the drum member 10 is constrained to rotate with the plate 60 while resting thereon, and at the same time the drum member 10 can at any time simply be lifted away from the plate 68 upwardly beyond the post 62.

Figure 4:
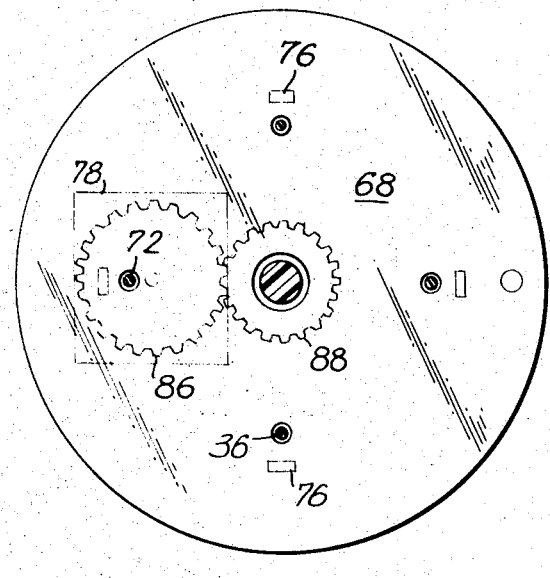

The top wall 70 of the base means 58 carries through suitable brackets 74 horizontal pins which support role rollers 76 for free rotary movement, and these rollers directly support the plate 68 at its underside, as indicated in FIG. 1. The distribution of the rollers 76 is indicated in FIG. 4.

The turning means which is provided for turning the drum member 10 with respect to the stationary conduit member 38 includes a clock mechanism 78 of a known construction which has a time indicating portion 80 and which has a manually adjustable portion 82. The top wall 70 of the base means 58 is spaced from the bottom wall 60 thereof by a pair of side members 84 so that the clock mechanism 78 is freely accessible at one side of the device. This clock mechanism 78 drives a gear 86 through a given angular increment at given time intervals. This gear 86 forms part of a transmission which includes a pinion 88 in the form of a ring coaxially fixed to and surrounding the tubular member 66 of the support means for the drum member 10. Thus, the transmission 86, 88 of the turning means interconnects the clock mechanism 78 thereof with the support means 66, 68 to rotate the latter through a given angular increment at predetermined intervals, so that in this way the drum member 10 will be turned through a given angular distance at predetermined intervals.

It is to be noted that not only is the drum member 10 made of a transparent plat plastic, but also the plate 68 and the top wall 70 are made of a transparent clear plastic, and in fact all of the wall structures can be made of a clear transparent plastic. The plate 70 fixedly carries at its underside a socket for a lamp 90 which is connected into the electrical circuit 92 of the clock mechanism 78. As is schematically shown in FIG. 1, current may be derived from any suitable source 94, which, instead of being the illustrated batteries, can be any wall outlet. Also, as is schematically shown in FIG. 1, a master switch 96 can be provided for turning the entire device on and off. Thus, when the switch 96 is closed not only will the clock mechanism 78 operate but in addition the lamp 90 will be illuminated to indicate that the device is operating, and furthermore because of the position of the lamp 90 at the front of the device substantially in alignment with the compartment which is beneath the outlet end 40 of the conduit member 38, the light from the lamp 90 will also serve to illuminate the portion of the outer wall 12 which defines the outer limit of that compartment which at any given incident is collecting urine.

Figure 5:
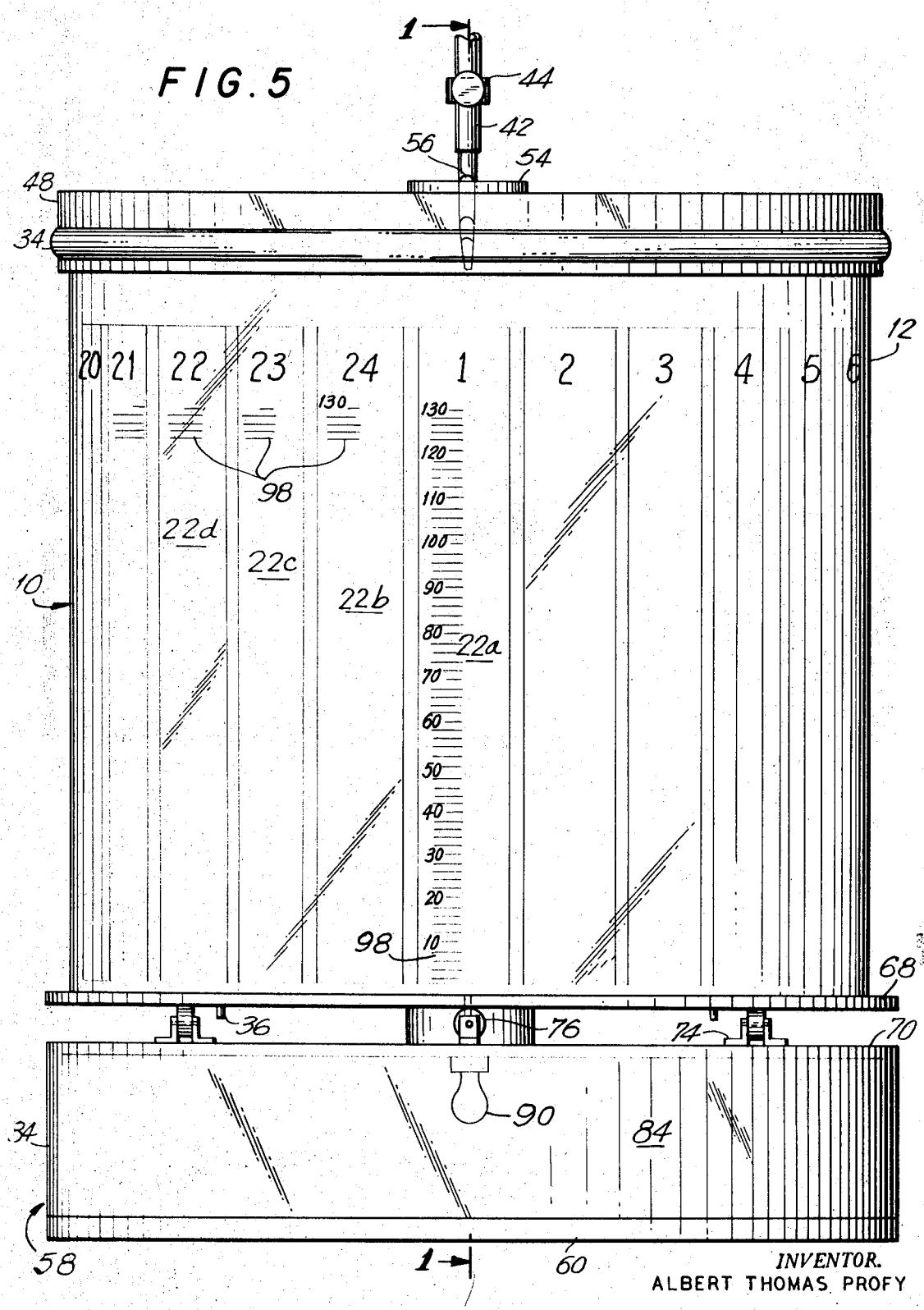
FIG. 5 is a side elevation of the structure of FIG. 1, as seen from the right side thereof.

As may be seen from FIG. 5, the outer wall 12 of drum member 10 has transparent wall portions respectively communicating with and forming part of the several compartments and respectively carrying graduations 98 so that each compartment has its own set of graduations 98 for indicating the volume of urine collected therein.

With the above-described structure of the invention the adjusting portion 82 of the clock mechanism 78 will be set to turn the drum member 10 through an angular increment of 15° at hourly intervals. Thus, with this construction during a twenty-four hour period each compartment will be situated beneath the outlet end 40 of the conduit member 38 for an interval of one hour. As was pointed out above, it is preferred to turn the drum member with respect to the conduit member. The reason for this is that in this way the particular compartment which is receiving urine at any given instant will necessarily be situated at the front of the device where it can easily be seen, and thus it becomes unnecessary to go around the device to find which particular compartment is receiving urine at a given instant. With the device of the invention, in order to record the rate of urinary output it is a simple matter to read the graduations at the compartments and to record the information very conveniently.

The device of the invention is of very great assistance to hospital personnel inasmuch as it can operate continuously for twenty-four hours without requiring any attention. At any time of the day it is possible to look at the time-indicating portion 80 of the clock mechanism 78 and at any one compartment to determine the substantially instantaneous rate of urinary output. For example, when the device is first started and assuming that the first compartment beneath the outlet end 40 of conduit member 38 is the compartment 22a, after 15 minutes has elapsed, as indicated by the time-indicator 80, the compartment 22a can be consulted. If during this time interval of 15 minutes 15 cc of urine has accumulated in the compartment 22a, as indicated by the graduations 98 thereof, then it is clear that the infusion rate used for intravenous feeding is adequate. On the other hand, if after an elapse of 15 minutes 30 cc of urine has accumulated, the flow rate would be 2 cc/mins., twice the normal volume, so that it would then be known that the rate of administered fluid would have to be decreased.

Any volume of urinary output over 1.5 to 2 cc. per minute would have little significance as to its exact volume, and for this reason the overflow means 30, 32 is provided to enable the excess volume to spill over into the overflow chamber 30.

Repeated specific gravity determinations during a twenty-four hour period are important in order to determine not only the amount, rate, and kind of fluid therapy but also the functioning status of the kidneys. For this reason the lid 46 is provided with the opening 52 so that when the cover 54 is displaced to uncover the opening 52 a urinometer may be introduced through the opening 52 into the collection compartment without interrupting operation of the device since each compartment remains stationary for one hour. After the necessary readings the urinometer is removed and the cover 54 is replaced to prevent escape of urinary odors.

Because the drum is divided into twenty-four compartments, each compartment will have a relatively small volume making for easy reading. With relatively large compartments such easy readings could not be achieved.

A total twenty-four hour urinary volume is often desired for chemical analysis. Since none of the urine collected by the device is discarded in the period of twenty-four hours, after his latter period the entire drum can be removed simply by lifting it from the plate 68, and with the drum thus intact with the collected urine therein it can be sent to a laboratory.

In the event that it is desired to determine the volume of urine in a twenty-four hour period, the volume in each compartment can be tabulated and the several volumes totaled in the event that there is no overflow into the central compartment. If there is overflow, then the entire drum can be emptied into a graduate and measured at the end of a twenty-four hour period.

As was indicated above the device of the invention requires very little time from hospital personnel. It operates continuously for twenty-four hours and no urine is discarded. At any time the nurse can regulate the fluid rate intravenously by noting the urinary flow rate during her shift. In the event that a nurse during one shift fails to record the volume per hour during her shift because she is too busy, for example, the recording can be made at the end of an 8-hour shift. Even if one nurse fails to make the necessary recording at the end of her shift the nurse on the following shift can still make the recordings, and if no one makes a recording during three successive 8-hour shifts, the drum is still intact and all of the information can still be recorded at the end of a twenty-four hour period.

Because of the illumination derived from the lamp 90, it is possible to make readings during the night without disturbing the patient.

In order to obtain specimens for analysis during a twenty-four hour period, either the catheter tube 42 may be detached and the catheter drained, or the opening 52 may be uncovered and a pipette may be inserted in order to remove some of the urine. The most common reason for such procedure is to determine the sugar and acetone concentrations in the urine of a diabetic patient, and inasmuch as only 5 drops of urine are required for this purpose such specimens are easily obtained without disturbing the functioning of the machine. In addition, it is possible at any time with the structure of the invention to insert test paper through the opening 52 and situate it next to the outlet 40 in order to be contacted by the urine.

When the operations are terminated the tube 42 is disconnected from the conduit member 38, and this conduit member 38 together with the lid 46 and the drum member 10 can simply be discarded. Inasmuch as all of these components are made of an inexpensive clear plastic material it becomes economically feasible to carry out such procedure, thus eliminating the prohibitive manpower and cost required to cleanse and sterilize equipment of this type. However, it will be noted that the more expensive components such as the clock mechanism 82 are retained for further use.

Although the above-described structure is preferred, it is also possible to provide an arrangement where the lid 46 rotates with the drum member 10. In this case, however, the conduit member 38 is still stationary, but it is required instead to extend at its vertical portion upwardly through a central opening of the lid 46 so that the latter can turn freely about the vertical portion of the conduit member 38 and to extend the nozzle to the compartment area. Of course, with such a construction the components 50 and 64 need not then be provided and part of the conduit member 38 would be situated at the location of the components 50 and 64. Thus, the conduit member 38 could simply rest on the top end of the post 62 extending upwardly through a central opening of the lid 46 which is in this case would turn together with the drum member 10, and instead of having an opening 52 and a cover 54 the lid would in this case simply be temporarily lifted from the drum member to give access to a compartment whenever required during operation of the device.

Another modification of the lid and conduit member construction contemplates the use of component 64 upon which the lid, having the conduit member 38 integral and positioned at the center, is fitted as in the case of component 50 upon component 64. In such a case a component such as 50 would extend downwardly from the center positioned conduit. In this case, as in the preferred embodiment the lid, facet and fitting component would not turn the drum.

It is to be noted that an added advantage achieved from the structure of the invention resides in its ability to indicate roughly the time of day simply by glancing at the exterior surface of the drum 10. As is apparent from FIG. 5, the several compartments are numbered 1 — 24, and in any given instant, one of these numbers is aligned beneath conduit 38. Thus, if at the beginning of one shift the number 1 compartment is aligned with the conduit 38, as shown in FIG. 5, then simply by glancing at the exterior of the drum, any hour of any shift is immediately indicated. With the parts in the position of FIG. 5 there is an indication of the first hour of the first shift. Assuming that there are three 8-hour shifts, when compartment 9 is aligned with the conduit 38, there will be an indication of the first hour of the second shift, while when the number 17 compartment is in the position of compartment 1 of FIG. 5, a glance at the structure will immediately indicate that the time of day corresponds to the first hour of the third shift. In this way it is possible to derive from the device an indication of the hour of the day simply by glancing at the device. Of course at any time the exact time of day can be determined by looking at the clock 80. Moreover, it is a simple matter to provide an arrangement where the hours indicated by the numbered compartments coincide with the time of day. For example, if the first shift starts at 1 a.m. and continues until 9 a.m., while the second shift goes from 9 a.m. to 5 p.m., and the third shift from 5 p.m. to 1 a.m., then the numbers shown in FIG. 5 will exactly correspond to the hours of the day with the post meridian hours being indicated by the numbers 13 — 14. Thus, in this case not only will a given hour of a given shift be indicated, but also the exact hour of the day will be indicated without any requirement of mentally transposing the indicated hour of a given shift into the particular hour of a day.

I claim:

1. In a device for measuring urinary output, a drum member having a vertical central axis and an open top, means in said drum member dividing the interior thereof into a plurality of equal compartments uniformly distributed about said axis, said drum member having transparent wall portions respectively forming parts of said compartments and having graduations associated therewith for indicating the volume of urine in each compartment, a lid covering said drum and formed with an opening, means for restraining said lid against rotational movement, said drum member and said lid being structurally related to one another for permitting relative rotational movement therebetween, urine discharge means passing through said opening and terminating in an outlet end adjacent the top of said member and situated at any given time over one of said compartments, support means supporting said drum member for rotary movement about said central axis, and turning means operatively connected to said drum member for turning the latter about said axis with respect to said lid and said discharge means.

2. The combination of claim 1 and wherein said means which divided divides the interior of said drum into said compartments also forms in the interior of said drum an inner overflow chamber surrounded by and communicating with said compartments and into which urine will overflow when the level of the urine in any compartment reaches a given elevation.

3. The combination of claim 1 and wherein there are twenty-four compartments in said drum member uniformly distributed about said axis thereof and said turning means turns said drum member throughout twenty-four hours, so that a urinary output for a duration of twenty-four hours can be measured.

4. The combination of claim 3 and wherein said compartments are provided with indicia at the exterior of said drum member for indicating the time of day.

5. The combination of claim 1 and wherein said lid is formed with a second opening radially aligned with said outlet end of said discharge means and located adjacent said outlet end so that through said second lid opening access may be had either to the outlet end of said discharge means or to a compartment communicating therewith.

6. The combination of claim 5 and wherein a cover member is carried by said lid for covering and uncovering said opening thereof.

7. The combination of claim 1 and wherein a base means is situated beneath said drum member, said support means includes a plate, and said base means is operatively connected with said plate to support the latter for rotary movement about said axis, said drum member being carried by and extending upwardly from said plate, and said turning means being carried by said base means and operatively connected to said plate for turning the latter and said drum member therewith.

8. The combination of claim 7 and wherein said plate is formed with a plurality of openings distributed about said axis and said drum member rests on said plate and has a bottom wall engaging the latter, said bottom wall of said drum member carrying a plurality of pins which respectively extend into said openings of said plate so that said drum member turns with said plate while being removable therefrom.

9. The combination of claim 7 and wherein said turning means includes an electrical clock mechanism and a transmission driven thereby and operatively connected to said plate, and a lamp connected into the circuit of said clock mechanism to be illuminated during operation of said mechanism, said lamp also being situated in the region of said one compartment which at any given time communicates with said discharge means to provide illumination for the graduations of said one compartment.